FAULT LOCATION SYSTEM

Filed Nov. 3, 1965 8 Sheets-Sheet 1

INVENTORS
THOMAS S. STAFFORD
JOSEPH A. SARUBBI

BY Gunter A. Hauptman
ATTORNEY

Feb. 24, 1970 T. S. STAFFORD ET AL 3,497,685

FAULT LOCATION SYSTEM

Filed Nov. 3, 1965 8 Sheets-Sheet 3

Feb. 24, 1970 T. S. STAFFORD ET AL 3,497,685

FAULT LOCATION SYSTEM

Filed Nov. 3, 1965 8 Sheets-Sheet 6

FIG. 4B (SHEET 1)
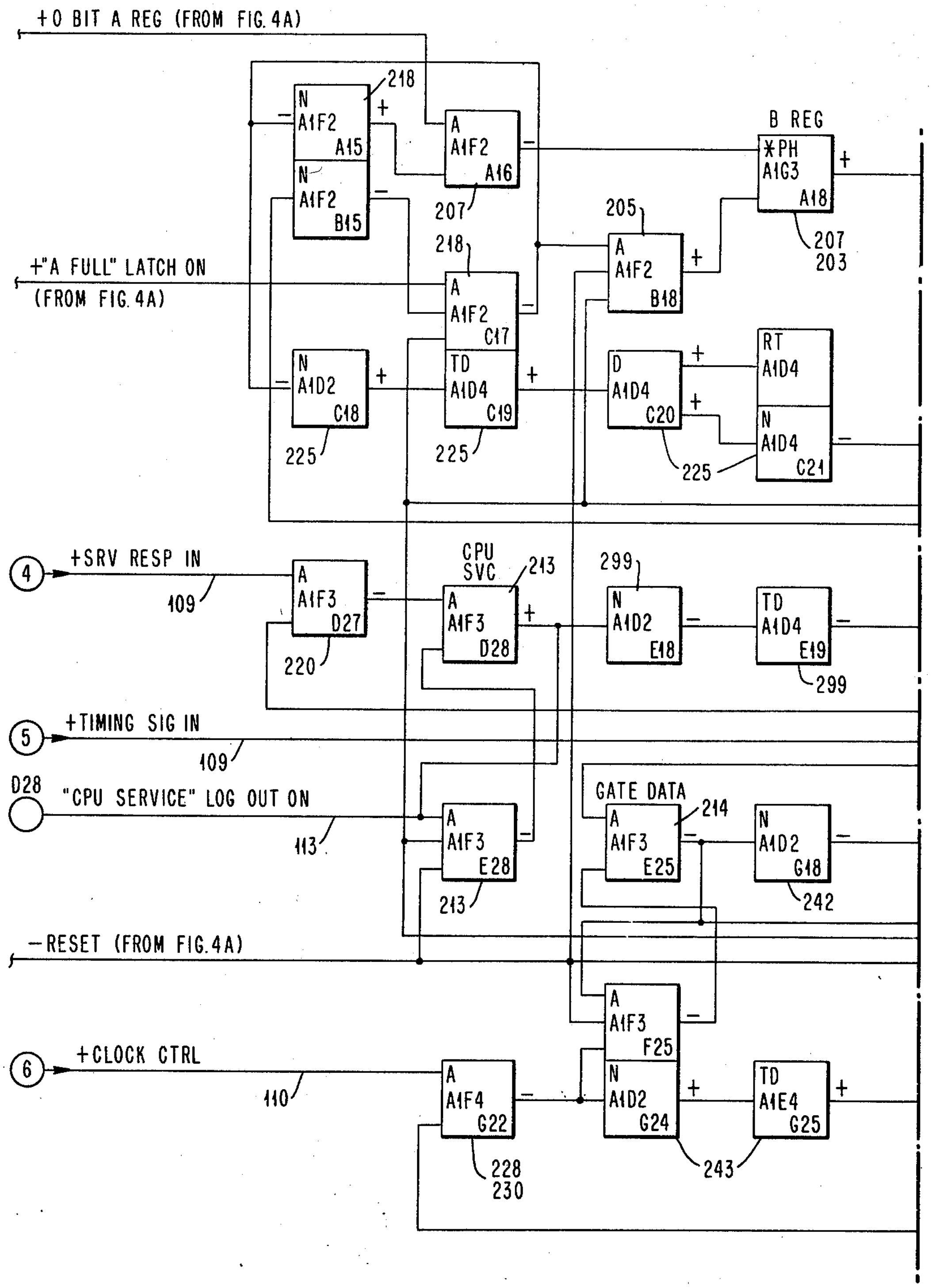

FIG. 4B (SHEET 2)
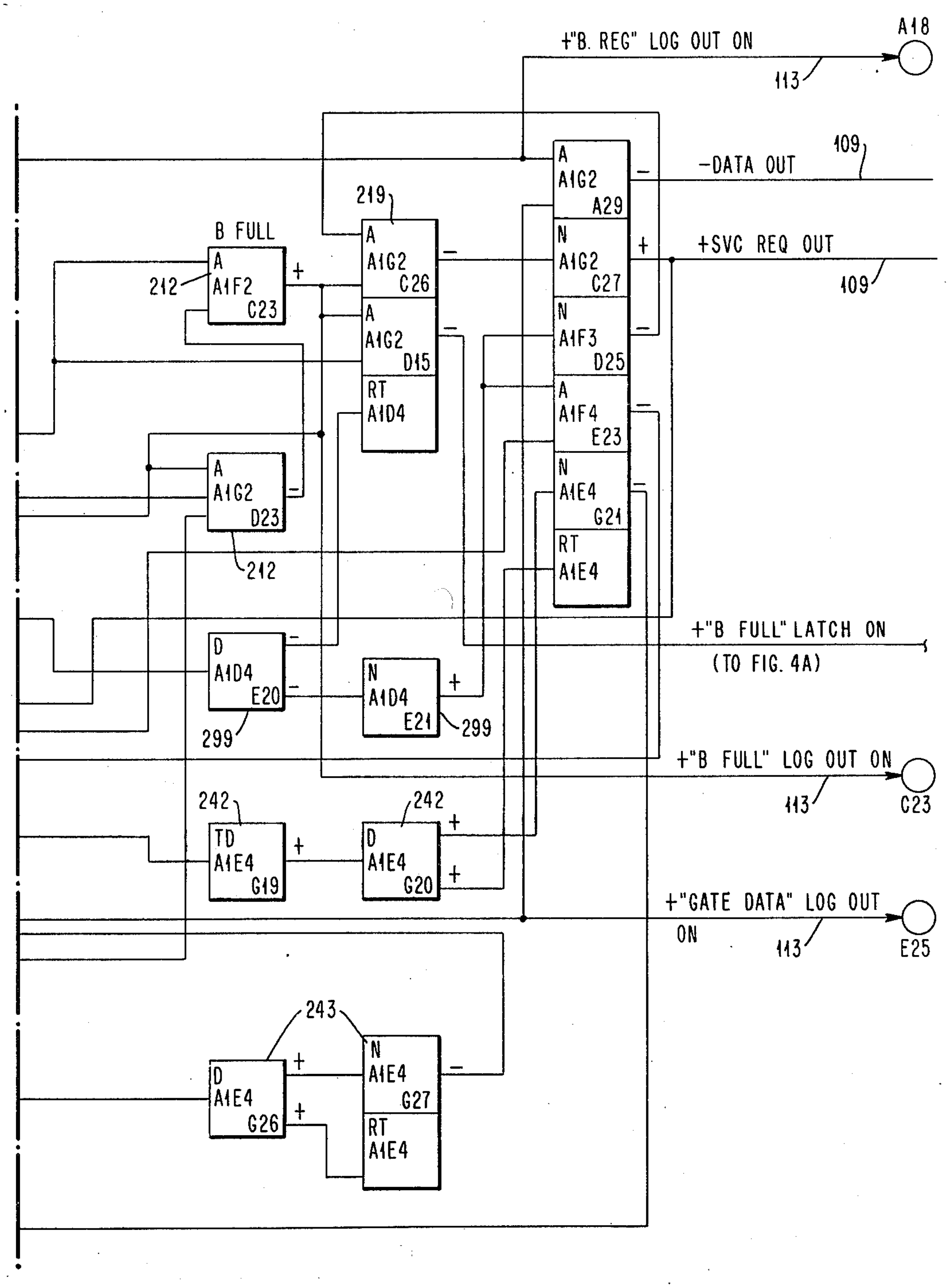

1

3,497,685
FAULT LOCATION SYSTEM

Thomas S. Stafford, Wappingers Falls, and Joseph A. Sarubbi, Poughkeepsie, N.Y., assignors to International Business Machines Corporation, Armonk, N.Y., a corporation of New York Filed Nov. 3, 1965, Ser. No. 506,204
Int. Cl. G06f *11/00*
U.S. Cl. 235—153 4 Claims

ABSTRACT OF THE DISCLOSURE

Disclosed is an apparatus for locating faults occurring in electronic data processing systems wherein those systems include logic circuitry and reset circuitry. The reset circuitry is initially tested and, if it is found to be operating properly, that reset circuitry is used to test the logic circuitry. In each test, a sequence of predetermined input binary patterns is supplied to corresponding inputs of the system being tested and the resultant output binary patterns emerging from selected outputs of the system are recorded. The initial sequence of predetermined binary input patterns results, if there are no faults in the resetting circuitry, to form a sequence of binary output patterns comprising only zero-bits. If there is an error, then the placement of the one-bits in the binary output patterns identifies, by reference to a predetermined table of predicted binary output patterns, the location of the faults in the resetting circuits. If the initial sequence of binary input patterns results in all zero-bits in the binary output patterns, subsequent sequences of binary input patterns are applied while selectively supplying and omitting reset signals so as to form subsequent resultant binary output patterns. As long as each successive binary output pattern corresponds to a predicted binary output pattern, another subsequent sequence of binary input patterns is supplied. However, if a binary output pattern does not correspond to a predicted binary output pattern, no further binary input patterns are provided and the non-predicted binary output pattern is compared with the contents of a table of non-predicted output patterns. When that non-predicted output pattern is found to compare with an entry in the table, the circuits which are at fault have been identified because the table includes identification of the circuits which, if faulty, cause that particular non-predicted output pattern. If the entire planned group of input binary sequences is supplied without resulting in any unpredicted binary output patterns, it is assumed that there are no faults in the system being tested.

This invention relates to electronic apparatus for locating faults occurring in electronic data processing systems. More particularly, the invention permits faults responsible for errors in the operation of an electronic data processing system to be localized for subsequent correction.

Electronic data processing systems are divided into units each constructed from electronic circuits comprising components such as transistors, capacitors and resistors. During the operation of the electronic data processing system, failure of any one of the components can disrupt the operation of the entire system.

In the prior art, there are found many techniques for automatically recognizing that a fault has occurred in an electronic data processing system by monitoring errors in the operation of the system. Such prior art techniques generally predict a result during a step in the operation of the complete system; variance between the actual result obtained during such step and the predicted result, indicates that an error has occurred.

2

In the prior art also, there is disclosed apparatus for correcting errors occurring during the operation of an electronic data processing system. Such corrections can often be made by repeating the steps during which the error occurred in the hope that the cause of the error was temporary and will not occur again during the repetition. Another scheme repeats the operation in a duplicate set of circuits. Still another scheme inserts a corrective quantity into the results obtained during the steps in which the error occurred to compensate for the error.

Therefore, it is seen that the foregoing prior art techniques detect and/or correct errors occurring during the operation of electronic data processing systems without reference to the actual cause of the error. That is, such prior art techniques do not identify the location of the structural fault responsible for the erroneous operation.

Heretofore, prior art apparatus for identifying the physical location of faults responsible for errors during the operation of an electronic data processing system has required extensive additional circuitry to be designed for, and installed in, the electronic data processing system. Such prior art apparatus has not been readily adaptable for use with existing electronic data processing systems without substantial additional expense.

For example, in an article entitled A Computer Organization and Programming System for Automated Maintenance by K. Maling and E. L. Allen, published in the "IEEE Transactions on Electronic Computers" in December 1963, volume EC–12, No. 5, page 887, an automatic technique for locating faults in an experimental circuit is described. A related approach is described in an article entitled Engineering Testing Techniques, by William Perzley, published in "Automatic Control" in September 1958, page 24. Essential to these techniques, is the provision of "probes" connected to the logical elements to be tested in the experimental circuit. Known input signals are applied to the input of the experimental circuit and the outputs of the probed logical elements are recorded for subsequent comparison with previously determined "correct" outputs. Analysis of the outputs of the probed elements aids in the identification of the cause of errors occurring in the operation of the experimental circuit. While this technique of fault location accurately identifies faults, it requires extensive additional wiring of probes into the circuit. The addition of numerous probes into an existing electronic data processing system affects the operation of the system and thus requires careful redesign of the entire system to accommodate the probes.

In an article entitled The Diagnosis of a Synchronous Subsequential Switching System by S. Seshu and D. N. Freeman, published in August 1962 in the "I.R.E. Transactions on Electronic Computers" volume EC–11, No. 4, page 459, there is described a system for testing the logic circuitry of a machine to localize faults where access is available only to the inputs and outputs of the machine under test. This system applies specified inputs to the machine under test, observes the outputs and compares these outputs with previously determined standard outputs. The results of the comparison are used to identify the component in the machine which has failed. While this system results in accurate pinpointing of faulty components in the logic circuitry, it requires a complicated special testing system in addittion to the machine being tested and does not identify faults in the control circuits not having logical functions.

It will be noted, that these prior art techniques either do not check all portions of the circuit under test completely, or require extensive additional apparatus to be inserted into the circuit being tested. In the areas tested by these prior art techniques, the accuracy of fault location may extend to the identification of individual components (such as a transistor) as the cause of an error in the operation of the circuit. Thus, in an existing electronic data processing system, where circuit elements are mounted upon discrete removable "circuit boards" these techniques would either fail to test all the circuit boards or would, for those circuit boards tested, be too accurate. While it is desirable to test every circuit board, it is not necessary to identify the particular component that has caused the fault.

Therefore, it is an object of this invention to provide apparatus for locating faults responsible for errors during the operation of an electronic data processing system without necessitating redesign of the system to accommodate extensive additional fault locating apparatus.

Another object of this invention is to automatically and rapidly locate faults in an existing electronic data processing system.

A further object of this invention is to provide apparatus for locating fault in both the logical elements, and in the associated control elements of an electronic data processing system.

Still another object of this invention is to achieve a rapid localization of faults in an electronic data processing system by determining the correct operation of major sections of the system and then utilizing such sections to check other sections for faults.

A further object of this invention is to provide a fault location technique which is expressly adapted for efficiently and economically identifying a group, comprising a relatively large number of components, in which a fault has occurred.

The foregoing and other objects, features and advantages of the invetion will be apparent from the following more particular description of the preferred embodiment of the invention, as illustrated in the accompanying drawings.

These objects are achieved by apparatus, embodying the invention, wherein electrical signals represent binary numerals, hereinafter referred to as 0-bits and 1-bits. The reset circuitry is initially tested and then, if it is found to be operating properly, it is used to test the logic circuits. In each test, a sequence of predetermined binary patterns is applied to corresponding inputs of the system being tested and the resultant binary patterns emerging from selected outputs of such system are recorded. An initial sequence of binary patterns includes a signal for "resetting" the system elements subsequent to the application of each binary input pattern and prior to the recording of each binary ouput pattern. Thus, the initial sequence of predetermined binary input patterns should, if there are no faults in the resetting circuits, result in a sequence of binary output patterns comprising only 0-bits. If this does not occur, the placement of any 1-bits occuring in the binary output patterns will, by reference to a predetermined table of predicted binary output patterns, indicate the location of the fault in the resetting circuits. On the other hand, if the binary output patterns do not contain any 1-bits, it is then known that the reset circuits are operating properly and that such reset circuits may thereafter be utilized for checking the associated logic circuitry. Therefore, assuming that the initial sequence of binary input patterns resulted in all 0-bits in the binary output patterns, subsequent sequences of binary input patterns are applied, selectively supplying and omitting reset signals, and the resultant binary output patterns are again recorded. As long as each successive binary output pattern corresponds to a predicted binary output pattern, another subsequent sequence of binary input patterns is supplied. However, if a binary output pattern does not correspond to the predicted binary output pattern, no further binary input patterns are provided and a table of output patterns is consulted to identify the circuits which are at fault. If the entire planned group of binary input pattern sequences is supplied without resulting in any unpredicted binary output patterns, it is assumed that there are no faults in the system being tested.

Figure 2A:
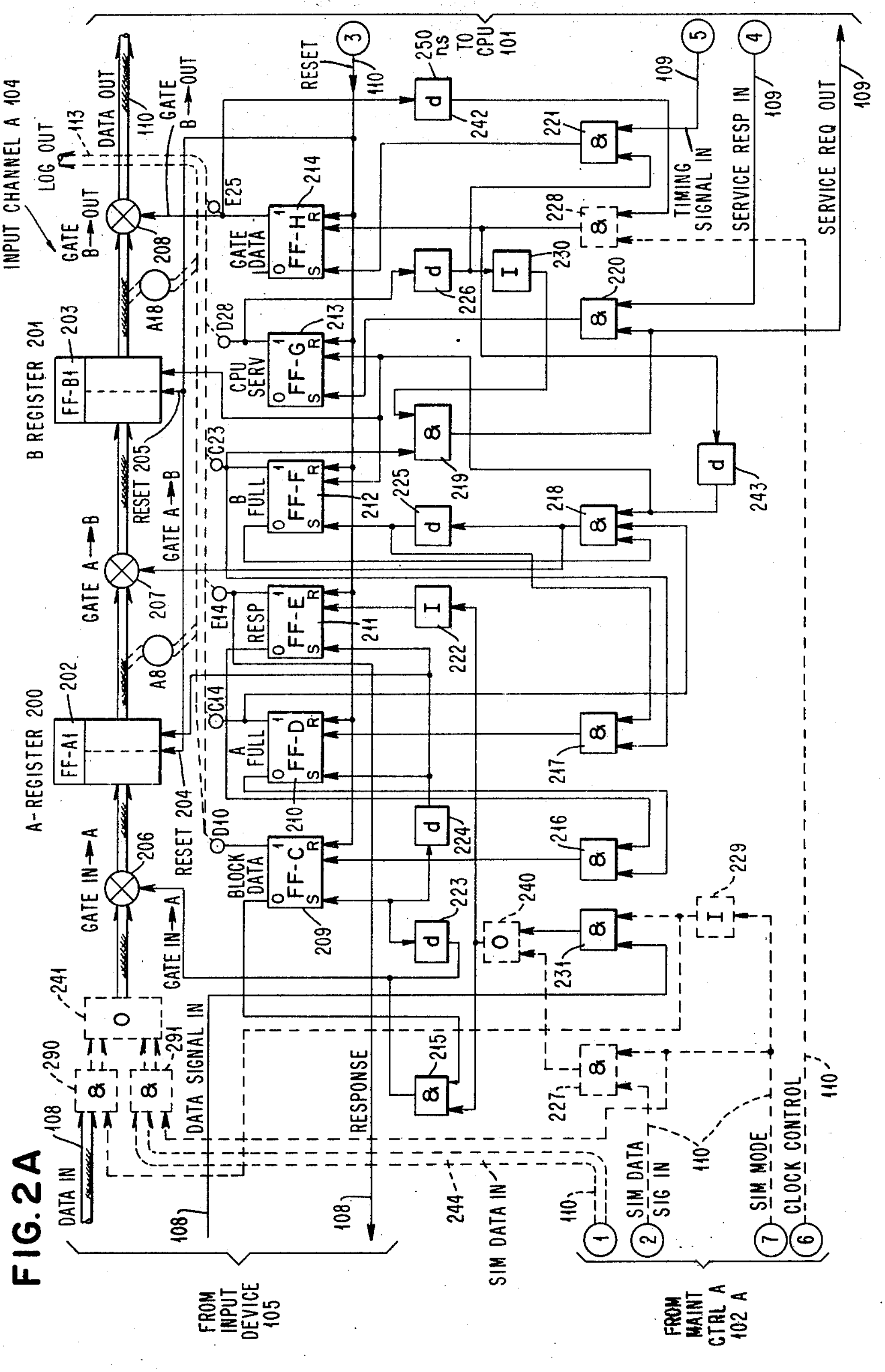
FIG. 2A is a circuit diagram illustrative of a unit to be tested.
Figure 4A:
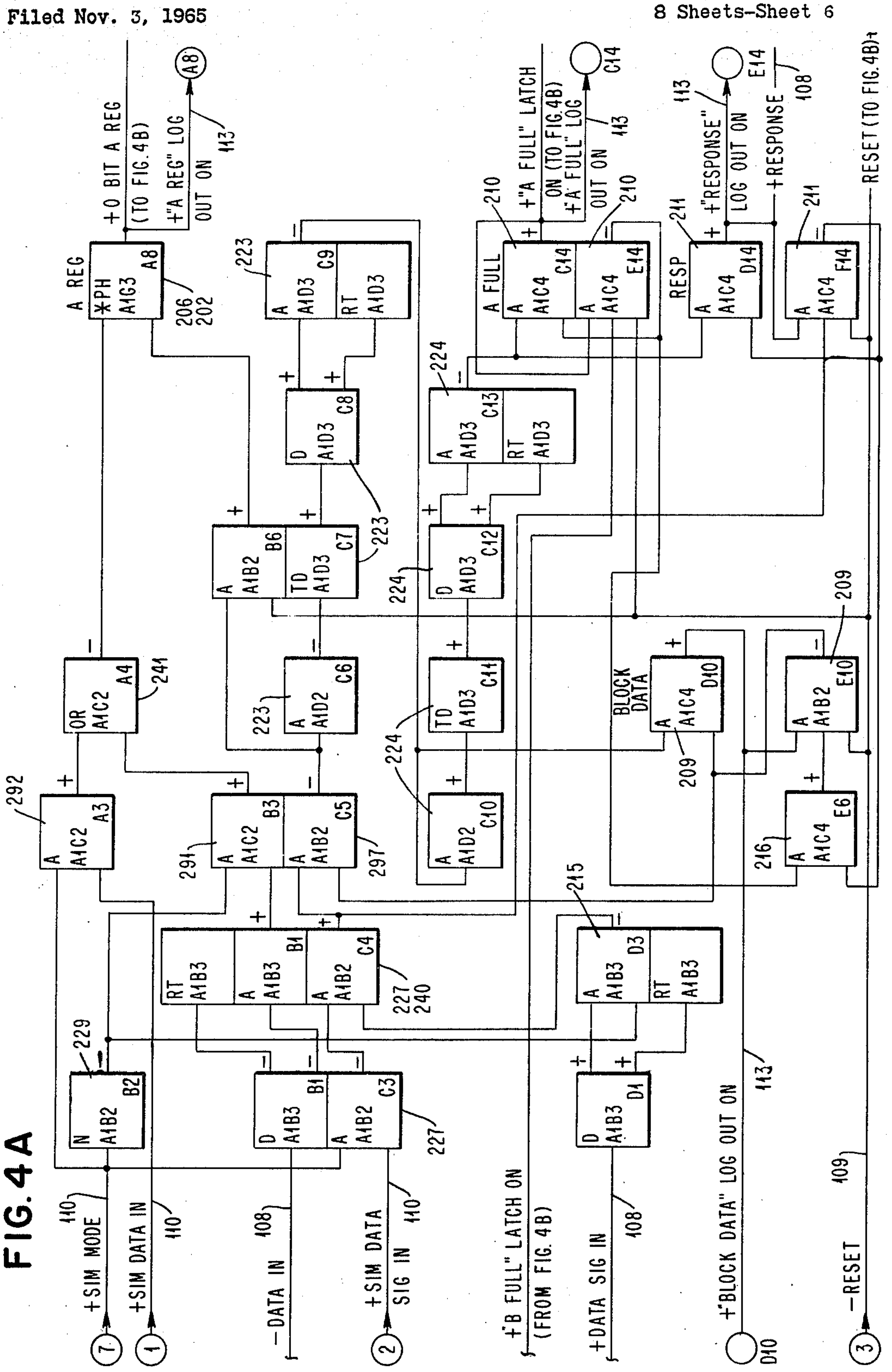

FIGS. 4A and 4B (sheets 1 and 2) together are a detailed circuit diagram illustrating one practical embodiment of the circuit of FIG. 2A.

GENERAL DESCRIPTION

Figure 1A:
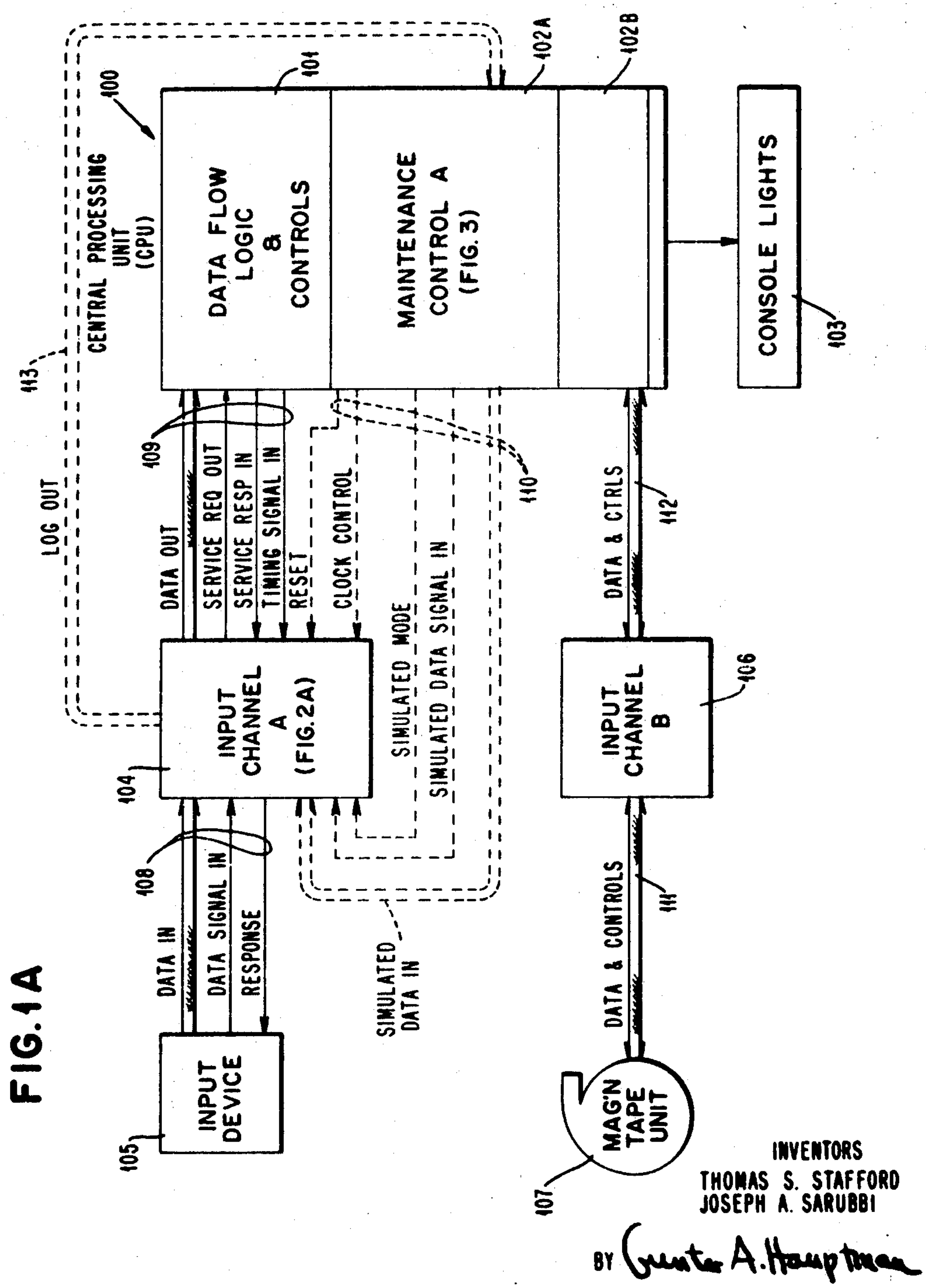
FIG. 1A is a block diagram of a system including a unit to be tested.

Referring to FIG. 1A, a typical electronic data processing system is shown. This system is shown solely for purposes of illustration, it being intended that any electronic system may utilize the invention. While the input channel A104 is chosen as the portion of the electronic data processing system to be tested, the invention may be applied to any other portion of the illustrated system. The electronic data processing system of FIG. 1A includes data flow logic and controls 100 comprising a central processing unit 101, maintenance controls A102A for testing the input channel A104, maintenance controls B102B for testing, if desired, input channel B106, and other maintenance controls (not shown) for additional portions of the system to be tested. The central processing unit 101 may be any general purpose, stored programmed, electronic data processing system for example the system disclosed in copending applications, Ser. No. 357,372, filed Apr. 6, 1964, now U.S. Patent 3,400,371 of Amdahl et al., and Ser. No. 419,677, filed Dec. 21, 1964, now U.S. Patent 3,325,788 of Hackl, assigned to the International Business Machines Corporation. A set of console lights 103 on the operator's console of the system is associated with the central processing unit 101 to visually indicate the operation of the electronic data processing system.

The data flow logic and controls 100 are connected, via data and control cable 109, 110, 112 and 113, to input channel A104 and input channel B106. These cables include a number of data and control lines, indicated by unbroken lines in FIG. 1A, known as the "interface" lines. A detailed description of the operation of the interface lines will be found in applications, Ser. No. 357,383, filed Apr. 6, 1964, now U.S. Patent 3,303,476 of Moyer et al., and Ser. No. 486,326, filed Sept. 10, 1965, now U.S. Patent 3,399,384 of Crockett et al., assigned to the International Business Machines Corporation. The Simulated Data In bus of the cable 110 and the Log Out bus 113 are shown as dashed lines to indicate that they are not normally provided between a central processing unit and its connected channels but, rather, are added for the purpose of the invention disclosed herein. The input device 105 and the magnetic tape unit 107 are merely illustrative of peripheral devices which may communicate with the input channels 104 and 106 and will not be further described. It is obvious that output channels could equally well illustrate the invention.

Figure 1B:
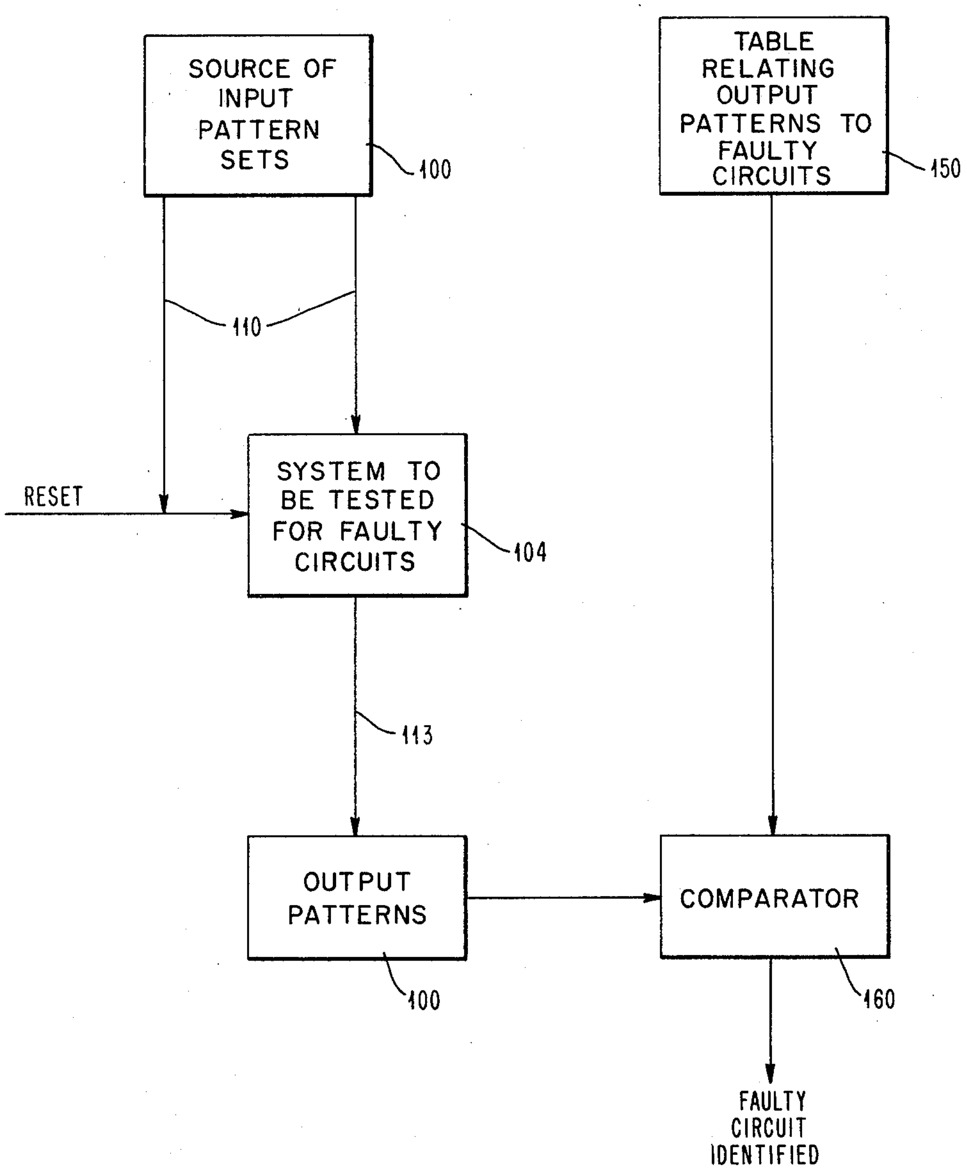
FIG. 1B is a block diagram illustrating apparatus used in testing the unit shown in FIG. 1A.

Referring now to FIG. 1B, the utilization of the units in FIG. 1A for fault location will be more specifically described. A sequence of binary input patterns is supplied over the Simulated Data In bus in cable 110 from the maintenance control A102A in the data flow logic and controls 100. The maintenance control A102A may originate these patterns from manually operated switches, in the maintenance control A102A or on the operator's console. An alternative source of binary input patterns may be the central processing unit 101, which in turn may receive these patterns from an associated memory or peripheral input device. The binary input pattern supplied on the Simulated Data In bus on the cable 110 includes a reset signal for operating the normal reset circuitry of the input channel A104. The outputs of input channel A104 are monitored by means of a Log Out bus 113 connected to the maintenance control A102A of the data flow logic and controls. These monitored binary output patterns are compared with predetermined output patterns provided from a table 150 by a comparator 160. The maintenance control A102A may utilize the central processing unit 101 as both a source of predetermined output patterns and also for the purposes of comparison, or additional hardware may be provided as part of the maintenance control A102A. Alternatively, the predetermined binary output pattern may be graphically presented to an operator who manually performs the comparison operation to identify faulty circuits.

The techniques involved in the automated design of electronic data processing systems will be briefly reviewed to explain their special applicability to the location of faulty circuits by means of the invention. A detailed description of these techniques will be found on pages 127–140 of the April 1964 "IBM Journal of Research and Development" (volume 8, No. 2). The building blocks of the illustrative electronic data processing system are electronic circuits mounted on individual circuit boards. Each circuit board is removably mounted on a larger terminal block capable of holding large groups of circuit boards, and performs one or more elementary logical functions. In the initial design of an electronic data processing system, the designer indicates the general elementary logical functions (such as AND, OR, etc.) necessary to accomplish the desired operations. In this initial design, the logical functions to be performed are generally indicated without any particular reference to the manner in which these functions are performed by the circuit boards available as building blocks to the designer. A typical example of such a logical circuit is shown in FIG. 2A to be described hereinafter. Subsequently, the designer's initial circuit is redrawn on special coordinate paper whereby each function is allotted to a separate coordinate. Operators prepare punched cards, for each coordinate, identifying the function to be performed and supply these cards to a computer. The computer is programmed to read the punched cards, allot the functions to the particular circuit boards available as building blocks, specify interconnections among the circuit boards and print a new wiring diagram. Selected portions of typical wiring diagram prepared by a computer in this manner is shown in FIGS. 4A and 4B. This wiring diagram identifies the functions performed and the physical location of the circuit boards carrying the elements for performing such functions.

In summary, FIGS. 1A and 1B illustrate the organization of an electronic data processing system capable of being tested for fault location. Due to the techniques used in designing the system, it is possible to recognize the function which is faulty and thereby identify the physical circuit board performing such function.

Detailed description

The system generally shown in FIGS. 1A and 1B, will now be described in more detail in order to illustrate the operation of the invention. The input channel A104 is shown in greater detail in FIG. 2A and the maintenance control A102A is shown in greater detail in FIG. 3.

*Input channel A*

Figure 2B:
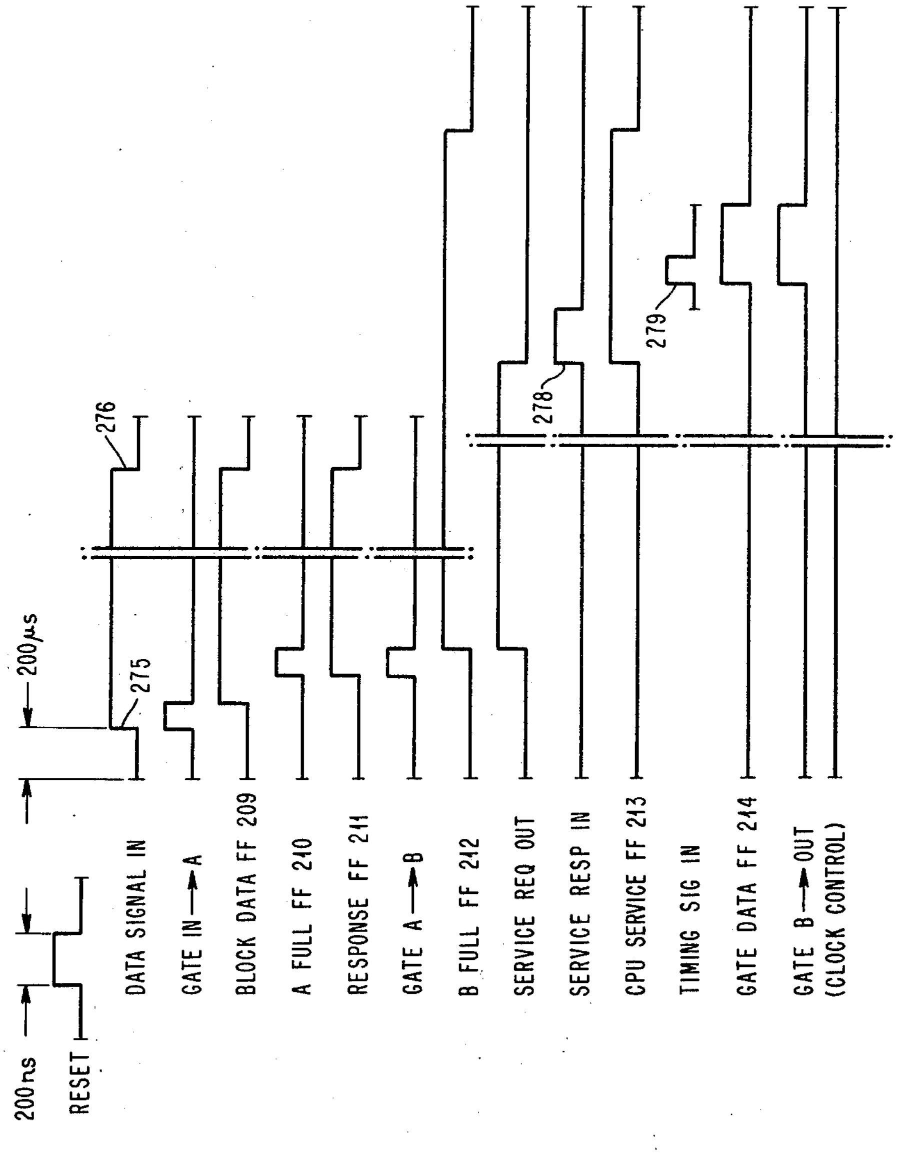
FIG. 2B is a wave-form diagram illustrating the signals present in the circuit of FIG. 2A.

Referring to FIGS. 2A and 2B, there is shown a circuit diagram of an illustrative circuit for performing the functions of an input channel and the signals present in the circuit during operation. The circuit is intended only for the purposes of illustration. Reference is made to Ser. No. 357,369, filed Apr. 6, 1964, of King et al., assigned to the International Business Machines Corporation, wherein complete automatic channel apparatus is disclosed. The circuit diagram of FIG. 2A does not specify the physical allotment the functions performed on circuit board building blocks. As will be later described, the circuit of FIG. 2A is repeated in the wiring diagram of FIGS. 4A and 4B to permit circuit faulty functions to be identified for the purposes of removing and replacing the circuit boards performing such functions.

The input channel A104 receives data on a Data In bus 108, temporarily stores the data in an A register 200 and then transfers it to a B register 201 to permit additional data to arrive on Data In bus 108 and be stored in A register 200. The data comprises binary 1-bits and 0-bits in any order and grouping. For illustration, the registers 200 and 201 comprise, respectively, a plurality of flip flops 202, etc. and 203, etc. for storing several binary characters each character comprising a plurality of bits. When the central processing unit 101 is ready, the information in B register 201 is removed via the Data Out bus of cable 110, a B register 201 is then free to be refilled from the A register 200. In this manner, the input device 105 may enter information into the A register 200 at one speed and the central processing unit 101 may remove data from the B register 201 at a different speed; that is, the input device 105 and the central processing unit 101 operate independently.

A bank of bistable flip flops 209 through 214 are provided to control the entry and removal of data into and from the A register 200 and the B register 201 to prevent destruction of data by enforcing cooperation between the independent input device 105 and central processing unit 101. Each of the flip flops 209 through 214 has a 0-bit output, a 1-bit output, a set input and one or more reset inputs. When a signal representative of a 1-bit occurs at the set input, a signal representative of a 1-bit appears at the 1-bit output. When a signal representative of a 1-bit appears at a reset input, a signal representative of a 1-bit appears at the 0-bit output of the flip flop. All of the flip flops are simultaneously reset by a 1-bit signal at the Reset Input line of cable 110. There are provided AND circuits 215 through 221 each operative, when signals representative of a 1-bit at its output to one of the inputs of the flip flops 209 through 214. INVERT circuit 222 receives a signal representative of either a 0-bit of a 1-bit and inverts it to the opposite representation which is then supplied to the reset input of the response flip flop 211. Delay circuits 223 through 226, 242 and 243 act to delay signals received at their inputs to prevent conflicts from occurring in the signals shown in FIG. 2B. The exact value of such delays are, unless specifically indicated in FIGS. 2A and 2B, not critical.

The operation of the circuit of FIG. 2A will now be described with reference to FIG. 2B. The AND circuit 290 is enabled, as will be explained below, to connect the Data In bus of cable 108 to the OR circuit 241. When the input device 105 places data on the Data In bus of cable 108 it also places a Data Signal In line of cable 108 at time 275 to indicate that information has been placed on the Data In bus of cable 108. Assuming that this is the first group of data (character) to be received, the gate 206 will be operated to transfer the data through the OR circuit 241 into the A register 200. The block data flip flop 209 and the A full flip flop 210 will be set (and the A register 200 will be reset), in that order, to prevent the entry of additional information and to indicate that the A register 200 contains data. Assuming that the B register 201 is initially empty, as indicated by the B full flip flop 212, the gate 207 will be operated to transfer the data from the A register 200 to the B register 201. The B full flip flop 212 is set to indicate that it contains data and the A full flip flop 210 will then be reset to indicate that the A register is again empty and ready to receive more information. The response flip flop 211 was set at the same time as the A full flip flop 210 to place a signal on the Response line of cable 108 indicating to the input device 105 that the data on the Data In bus of cable 108 has been received and may now be removed from the Data In bus of cable 108. When this is done, as indicated at time 276 by the removal of the signal from the Data Signal In line of cable 108, the response flip flop 211 is reset causing the block data flip flop 209 to be reset via AND circuit 216. When additional information is available from the input device 105, it will be placed on the Data In bus of cable 108 and a signal will be placed on the Data Signal In line of cable 108 and entered into the A register 200 as previously described.

When the B full flip flop 212 is set to indicate that the B register 201 contains data, a signal appears on the Service Request Out line of cable 109 to indicate to the central processing unit 101 that data is available from the B register 201. When, at time 278, the central processing unit 101 is ready to receive this information, it applies a signal to the Service Response In line of cable 109 setting the CPU service flip flop 213. Once the CPU service flip flop 213 set to place a signal on its 1-bit output, the Invert circuit 230, after a delay determined by Delay circuit 226, disables the AND circuit 219. Upon the occurrence, at time 279, of a timing signal on the Timing Signal In line of cable 109, the gate data flip flop 214 operates the gate 208 to transfer the information in the B register 201 to the central processing unit 101 via the Data Out bus of cable 110. Thereafter, the gate data flip flop 214 is reset and, after a delay determined by Delay circuit 243, the B full flip flop 212, the CPU service flip flop 213, and the B register 201 are reset. The operation just described will now again be repeated.

Still referring to FIGS. 2A and 2B, the circuitry so far described is assumed to be normally present. For the purpose of illustrating the invention, additional circuitry, indicated in FIG. 2A by dashed lines, is necessary. Data is entered into the input channel A104 directly from the maintenance control A102A by means of a Simulated Data In bus 244 of cable 110. A signal on the Simulated Data Signal In line of cable 110 indicates that there is data on the Simulated Data In bus 244. This information is received from the maintenance control A102A via AND circuit 291, to the exclusion of information from the input device 105, when a signal on the Simulate Mode line of cable 110 enables AND circuit 291 and, by means of Invert circuit 229, disables AND circuit 290. The AND circuit 227 is operable, upon the occurrence of signals on the Simulated Data Signal In line of cable 110 and the Simulate Mode line of cable 110, via the OR circuit 240 and AND circuit 215 to enable the gate 206 in the same manner as previously described with reference to the input device 105. The signal on the Simulate Mode line of cable 110 blocks the AND circuit 231 because the INVERT circuit 229 permits signals on the Simulated Data Signal In line of cable 110 to control the input channel A104 to the exclusion of any signals that might be present on the Data Signal In line or cable 108. The signal on the clock control line of cable 110 is normally present to allow the signal from Delay circuit 242 to pass through AND circuit 228. When the maintenance control A201A is used to operate input channel A104, it is sometimes desirable to cause the AND circuit 228 to block the output of Delay circuit 242 (by removing the signal from the clock control line of cable 110) in order to examine the states of flip flops 209 through 214 and registers 200 and 201.

The maintenance control A102A is given access to select normally available inputs to the input channel A104 designated by circles numbered 1 through 7, to select normally available outputs indicated by the circles designated A8, A18, C14, C23, D10, D28, E14 and E25. As will be further described with reference to FIGS. 4A and 4B, the output designations identify the circuit board upon which the circuit performing the function indicated in FIG. 2A is physically located.

*Maintenance control*

Figure 3:
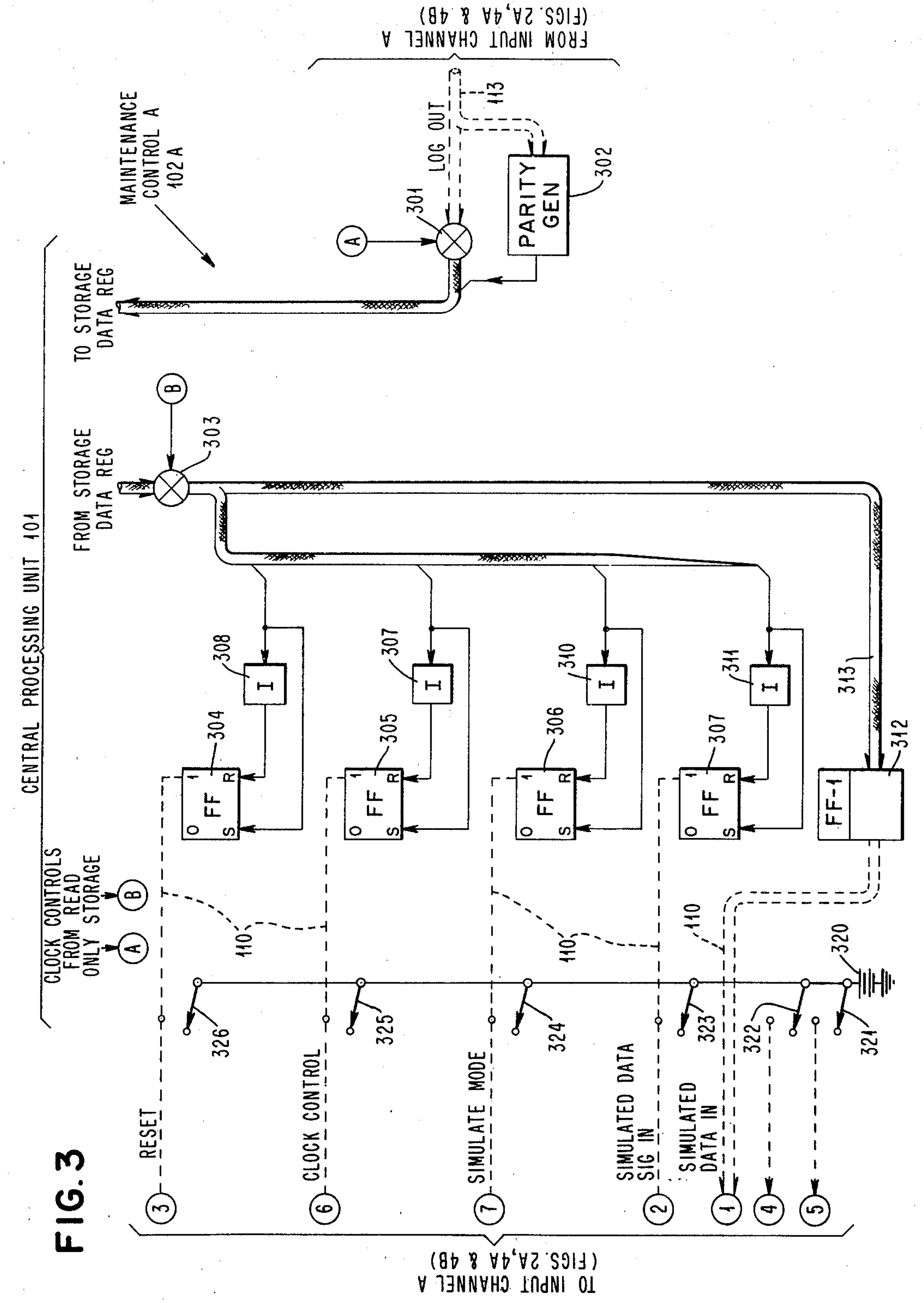
FIG. 3 is a circuit diagram of control circuits.

Referring to FIG. 3, an illustrative embodiment of the maintenance control A102A will be described. While there may be several alternative sources of the binary input patterns supplied to the input channel A, this particular embodiment receives binary input patterns either from the central processing unit 101 or from manually operated switches 321 through 326 associated with a battery 320. Similarly, binary output patterns received from the input channel A may be transferred to places other than the central processing unit 101, as shown in FIG. 3, and the console lights 103 as shown in FIG. 1A. It is assumed for this example that the central processing unit 101 is the unit described in the previously identified Ser. Nos. 357,372 and 419,677. The central processing unit 101 supplies from its read-only storage, clock controls A and B supplied to the gates 301 and 303 in an order allowing gate 303 to initially supply a binary input pattern and, subsequently, allowing gate 301 to receive a binary output pattern. Binary input patterns comprising four signals: Reset, Clock control, Simulate Mode and Simulated Data Signal In, are supplied from the storage data register in the central processing unit 101 to the flip flops 304 through 307, and a character is similarly supplied on cable 313 to register 312. If the signals are representative of a 1-bit, the corresponding ones of the flip flops 304 through 307 and the flip flop positions in the register 312 are set to the 1-bit conditions to place signals on the corresponding ones of the output lines in cable 110 supplied to the input channel A 104. In the event a signal representative of a 0-bit is supplied by the storage data register, the corresponding one of the INVERT circuits 308 through 307 sets the associated one of the flip flops 304 through 307 to the 0-bit position. These lines, together with the Timing Signal In and Service Response In lines from the central processing unit 101, constitute the binary input signal pattern utilized for fault location by the input channel A104.

The maintenance control A102A receives binary output patterns, from the Log Out bus 113, which patterns are transferred via gate 301 to the storage data register of the central processing unit 101 together with an additional "parity" bit generated for checking purposes by the parity generator 302 as a function of the binary output pattern on the Log Out bus 113.

OPERATION

The operation of the invention will now be described with reference to FIGS. 4A and 4B, which together form a wiring diagram showing the inter-connection and location of circuit boards containing elements for performing the function of the circuit diagram of FIG. 2A. The blocks of FIGS. 4A and 4B are labeled by numbers corresponding to the identifying numbers in FIG. 2A. Where a block in FIGS. 4A and 4B is not so labeled, it is required by the characteristics of the particular circuits used and not by the functions called for in FIG. 2A. For example, resistive terminations RT are associated with each delay circuit D used. Occasionally, one block in FIGS. 4A and 4B will perform several of the functions called for in FIG. 2A and, in other cases, several blocks in FIGS. 4A and 4B are necessary to perform a single function indicated by a single block in FIG. 2A; for example, two AND circuits A are necessary in FIGS. 4A and 4B to perform the operation of a single flip flop in FIG. 2A.

The following Table A lists the functions identified by the letter in the top left corner block of FIGS. 4A and 4B:

TABLE A

| | |
|---|---|
| A | AND |
| D | DELAY (Driver/Receiver) |
| N | OR/INVERT |
| *PH | REGISTER |
| RT | RESISTIVE TERMINATION |
| TD | TIME DELAY |

The function of the foregoing circuits is explained in detail in the referenced patent application Ser. No. 357,372.

The output of each block in FIGS. 4A and 4B is indicated by either a positive (+) or negative (—) sign, which identifies the signal value representing a 1-bit. Each circuit card, carrying the blocks symbolized in FIGS. 4A and 4B, is identified by a four character card designation. For example, in FIG. 4A, the OR circuit 229 is found on circuit card A1B2. in addition, for convenience, each logic block in FIGS. 4A and 4B is identified by a different two or three charatcer designation; for example, OR circuit 229 is identified B2. Several logic blocks may be contained on the same circuit card. For example, card A1B2 contains logic blocks B2, B6, C3, C4, C5 and E10.

In the description of the operation to follow, binary input patterns will be designated in the following order:

Input lines of cables 109 and 110

1 2 3 4 5 6 7 and binary output patterns will be indicated in the following order:

Log out lines of bus 113

A8 A18 C23 C14 D28 D10 E25 E14

*Reset tests.*—Referring to FIG. 3, the B clock control from the read-only storage in the central processing unit 101 supplies a signal to operate gate 303 to supply to the circuit of FIGS. 4A and 4B three binary input patterns in sequence from top to bottom.

Reset Test 1

0 0 1 0 0 0 1
1 1 0 0 0 0 1
0 0 1 0 0 0 1

It will be noted that only one data bit is shown in the first column for the Simulated Data In line of cable 110, it being understood that a plurality of such lines may be provided. The binary output pattern on Log Out lines of bus 113, should, of course, be comprised entirely of 0-bits because the third binary input pattern supplied included a 1-bit in the reset position 3. In any event, referring to FIG. 3, the binary output pattern will be recorded by the occurrence of a B clock control signal from the read-only storage in the central processing unit 101, causing the binary output pattern to be entered into the storage data register together with a parity bit.

Subsequently, the foregoing operation is repeated for each one of the additional tests indicated below, the output pattern in each case being recorded.

Reset Test 2

1 1 0 0 0 0 1
1 1 0 1 0 0 1
1 1 0 0 1 0 1
0 1 0 0 0 0 1
0 0 1 0 0 0 1

Reset Test 3

1 1 0 0 0 0 1
1 1 0 1 0 0 1
1 1 0 0 1 0 1
0 1 0 0 0 0 1
0 1 0 0 0 0 1
0 0 0 0 0 0 1
0 0 1 0 0 0 0

Reset Test 4

0 0 1 0 0 1 1
1 1 0 0 0 1 1
1 1 0 1 0 1 1
0 0 1 0 0 0 1

Reset Test 5

0 0 1 0 0 1 1
1 1 0 0 0 1 1
1 1 0 1 0 1 1
1 1 0 1 0 1 1
1 1 0 0 1 1 1
1 1 0 0 0 1 1
0 0 1 0 0 0 1

Reset Test 6

0 0 1 0 0 1 1
0 1 0 0 0 1 1
0 0 0 0 0 1 1
1 1 0 0 0 1 1
0 0 0 0 0 1 1
0 0 1 0 0 0 1

Reset Test 7

0 0 1 0 0 0 1
0 0 0 1 0 0 1
0 0 1 0 0 0 1

The binary output patterns from all seven reset tests having been recorded, they are then OR'd together. The OR'ing can also be conveniently performed by recording the output patterns in the same register so that after the seventh test the register will contain a 1-bit in any position in which one or more of the output patterns had a 1-bit. If the reset circuitry of the input channel A104 was properly operative, each of the binary output patterns should have comprised all zeros, and the OR function of the six output patterns should also consist entirely of zeros. If there is a 1-bit in any position of the OR'd binary output patterns, the position and number of 1-bits will indicate the circuits responsible for the failure. The following Table B identifies the circuits which were responsible for the failure. All possible permutations of the OR'd patterns are not given in Table B because only those patterns which could occur due to a single (as opposed to multiple) failure have been selected.

TABLE B

| Reset Test Output Patterns | Failure List |
|---|---|
| 0 0 0 0 0 0 0 0 | No failure detected |
| 1 0 0 0 0 0 0 0 | A8+, B6−, A4−, A3+, B3+ |
| 0 1 0 0 0 0 0 0 | A18+, B18−, A16− |
| 0 0 1 0 0 0 0 0 | C23+, D23−, C21−, C20+, C19+, C18+, C17− |
| 0 0 1 1 0 0 0 0 | C14+, D14− |
| 0 0 0 0 1 0 0 0 | D28+, E28−, D27− |
| 0 0 0 0 0 1 0 0 | D10+, E10− |
| 0 0 0 0 0 0 1 0 | E25+, F25−, E23− |
| 0 0 0 0 0 0 0 1 | E14+, F14− |
| 0 0 1 1 0 0 0 1 | C13−, C12+, C11+, C10+ |
| 0 0 1 1 0 1 0 1 | C9−, C8+, C7+, C6+, C5−, C4+, C3−, D3− |

The sign following the identification of the logic block in the failure list indicates the direction in which the circuit failed; for example, a "+" sign means that the corresponding circuit output should have had a negative signal, but instead had a positive signal.

If a 1-bit appeared in any position of the binary output pattern shown in Table B, the fault location operation will terminate since the location of the fault has been identified. For example, if a 1-bit appears in the second (A18) column, either logic block A18, B18, or A16 is the cause. Removal of the circut boards A1F2 and A1G3 carrying these circuits will correct this fault and permit normal operation of the electronic data processing system. On the other hand, if the output pattern consisted entirely of 0-bits, the fault has not yet been located. It has however, in the latter case been established that the reset circuitry is operative and may thereafter be used to further check the input channel A104.

*Progressive Tests.*—Once the reset circuitry has been eliminated as a source of faults, it is possible to provide additional input patterns to localize, with the aid of the reset circuitry, the fault in the logic circuitry. In some sequences of input patterns it will be advantageous to initially reset the logic circuitry and subsequently to supply additional binary input patterns without intervening resets. For each sequence of binary input patterns, there will be one "correct" binary output pattern and a group of "incorrect" binary output patterns indicative of particular types of failures. The balance of the possible output patterns will not occur, either because of the construction of the circuit or the previous testing of the reset circuitry.

Referring again to FIG. 3, the B clock control signal in the read-only storage of the central processing unit 101 will cause the data in the storage data register to be passed through gate 303 to supply, in conjunction with Timing Signal In and Service Response In signals also supplied from the storage data register, two binary input patterns on cables 109 and 110 to FIGS. 4A and 4B as follows:

Progressive Test 1

0 0 1 0 0 0 1

1 1 0 0 0 0 1

Subsequently, an A clock control signal from the read-only storage in the central processing unit 101 will cause a binary output pattern appearing on the Log Out bus 113 to pass through the gate 301 and be stored in the storage data register of the central processing unit 101. This binary output pattern will then be compared with the following Table C, by means of an operation performed by the central processing unit 101, by a print-out for subsequent independent comparison with the failure list, or by display on the console lights 103 for comparison with a failure list by an operator.

TABLE C

| Test 1 Output Patterns | Failure List |
|---|---|
| 1 1 1 0 0 1 0 1 | No failure detected |
| 0 0 1 0 0 1 0 1 | A4+, A3−, B6−, A8− |
| 1 0 1 0 0 1 0 1 | A16+, A18−, A15−, B18−, B18+ |
| 0 0 0 0 0 0 0 0 | C5+, C4−, C3+ |
| 1 0 0 0 0 0 0 0 | C6−, C7−, C8−, C9+ |
| 1 0 0 0 0 1 0 0 | C10−, C11−, C12−, C13+ |
| 1 0 0 0 0 1 0 1 | C14−, D14+, G27−, G26+, G25+, G24+, G22− |
| 1 0 0 1 0 1 0 1 | B15−, C17+ |
| 1 1 0 1 0 1 0 1 | C23−, C21+, C20−, C19−, C18− |
| 1 1 1 1 0 1 0 1 | D15+, E6− |
| 1 1 1 0 0 0 0 1 | E10+, D10− |
| 1 1 1 0 0 1 0 0 | E14−, F14+ |
| 1 1 0 0 0 1 0 1 | D23+ |

If the binary output pattern is, as shown in the first line above, indicative of no faults, the next test in the series, Progressive Test 2, will be performed. On the other hand, if one of the other patterns indicated above occurs, the source of the fault will be indicated by reference to the above Table C and the fault location operation is terminated and the faulty circuit card or cards replaced.

Subsequent progressive tests are performed in the same manner and the binary output pattern resulting from each sequence of binary input patterns for each test will be used to determine if a fault has been located or whether the next fault locating test should be performed. Whenever a pattern indicative of the fault is detected, no further tests are performed. If all of the following tests are performed without the location of a fault, the fault was either transient in nature or multiple compensatory failures occurred. The balance of the Progressive Tests are:

Progressive Test 2

1 1 0 0 0 0 1

1 1 0 1 0 0 1

1 1 0 0 1 0 1

0 1 0 0 0 0 1

Progressive Test 3

0 0 0 0 0 0 1

Progressive Test 4

0 0 1 0 0 1 1

1 1 0 0 0 1 1

1 1 0 1 0 1 1

Progressive Test 5

1 1 0 0 1 1 1

1 1 0 0 0 1 1

Progressive Test 6

0 0 1 0 0 1 1
0 1 0 0 0 1 1
0 0 0 0 0 1 1
1 1 0 0 0 1 1
0 0 0 0 0 1 1

Progressive Test 7

0 0 1 0 0 0 1
0 0 0 1 0 0 1

The failure lists for selected binary output patterns resulting during each Progressive Test appear in Tables D through I below, corresponding to Tests 2 through 7 respectively.

TABLE D

| Test 2 Output Patterns | Failure List |
|---|---|
| 1 1 1 0 1 1 1 1 | No failure detected |
| 1 1 1 0 0 1 0 1 | D28−, D27+, C27−, C26+, D25− |
| 1 1 1 0 1 1 0 1 | E25−, F25+, E23+, E21−, E20+, E19+, E18+ |
| 1 1 1 0 0 1 1 1 | E28+, E21+, E20−, E19−, E18− |
| 0 1 1 0 1 1 1 1 | B6+ |

TABLE E

| Test 3 Output Patterns | Failure List |
|---|---|
| 1 1 1 0 1 0 1 0 | No failure detected |
| 1 1 1 0 1 1 1 0 | E6+ |

TABLE F

| Test 4 Output Patterns | Failure List |
|---|---|
| 1 1 1 0 1 1 0 1 | No failure detected |
| 1 0 0 0 0 1 0 1 | G21+, G20−, G19−, G18− |

TABLE G

| Test 5 Output Patterns | Failure List |
|---|---|
| 1 0 0 0 0 1 0 1 | No failure detected |
| 1 1 1 0 1 1 1 1 | G21−, G20+, G19+, G18+, G22+ |
| 1 1 1 0 1 1 0 1 | G27+, G26−, G25−, G24− |
| 1 1 0 0 0 1 0 1 | A15+ |

TABLE H

| Test 6 Output Patterns | Failure List |
|---|---|
| 1 0 1 1 0 1 0 0 | No failure detected |
| 1 1 1 0 0 0 0 0 | B15+ |
| 1 0 1 0 0 0 0 0 | D15− |

TABLE I

| Test 7 Output Patterns | Failure List |
|---|---|
| 0 0 0 0 0 0 0 0 | No failure detected |
| 0 0 0 0 1 0 0 0 | C27+, C26− |

It has been shown how an existing unit in an electronic data processing system, such as input channel A104A, can be rapidly tested to determine the location of faults, without extensive additional hardware. This technique rapidly tests not only the logic circuitry but also the associated control, especially the reset, circuitry enabling the tested circuitry to be utilized in testing the balance of the untested circuitry. The particular binary input patterns and binary output patterns utilized are arrived at individually for each particular circuit by assuming a set of binary input signals and then determining the possible binary output patterns that result from each possible failure of circuits in the path of the assumed binary input pattern. It is not necessary that every permutation of input patterns be applied as long as each output of each logic block is tested once by means of a binary input signal. Thus, if the logic blocks effected by each binary input pattern are noted, the remaining untested logic blocks will suggest the remaining binary input patterns that are necessary. In the illustrated operation, the following Table J shows that the binary input patterns test every circuit:

TABLE J

| Logic Block | On | Off | Logic Block | On | Off | Logic Block | On | Off |
|---|---|---|---|---|---|---|---|---|
| A3 | R | 1 | C11 | R | 1 | E6 | 3 | 1 |
| A4 | 1 | R | C12 | R | 1 | E10 | 1 | R |
| A8 | R | 1 | C13 | 1 | R | E14 | R | 1 |
| A15 | 5 | 1 | C14 | R | 1 | E18 | 2 | 2 |
| A16 | 1 | R | C17 | 1 | R | E19 | 2 | 2 |
| A18 | R | 1 | C18 | R | 1 | E20 | 2 | 2 |
| A29 | -- | -- | C19 | R | 1 | E21 | 2 | 2 |
| B1 | -- | -- | C20 | R | 1 | E23 | 2 | R |
| B2 | -- | -- | C21 | 1 | R | E25 | R | 2 |
| B3 | R | -- | C23 | R | 1 | E28 | 2 | R |
| B6 | 2 | R, 1 | C26 | 2 | 7 | F14 | 1 | R |
| B15 | 6 | 1 | C27 | 7 | 2 | F25 | 2 | R |
| B18 | 1 | R, 1 | D1 | -- | -- | G18 | 5 | 4 |
| C3 | 1 | R | D3 | -- | R | G19 | 5 | 4 |
| C4 | R | 1 | D10 | R | 1 | G20 | 5 | 4 |
| C5 | 1 | R | D14 | 1 | R | G21 | 4 | 5 |
| C6 | R | 1 | D15 | 1 | 6 | G22 | 5 | 1 |
| C7 | R | 1 | D23 | 1 | R | G24 | 1 | 5 |
| C8 | R | 1 | D25 | -- | 2 | G25 | 1 | 5 |
| C9 | 1 | R | D27 | 2 | R | G26 | 1 | 5 |
| C10 | R | 1 | D28 | R | 2 | G27 | 5 | 1 |

It is seen from Table J that each logic block is tested for its "off" condition as well as its "on" condition in one of the numbered tests or in the Reset (R) Test. The dashes refer to logic blocks which are outside the test area and cannot be tested.

Another technique for evolving a set of binary input and output patterns utilizes a table similar to Table J. Every logic block in the circuit to be tested is listed, all possible permutations of binary input patterns are supplied, and the binary output patterns resulting from each possible failure are developed. The tests in which the failure of each logic block is detected are then entered on a list such as Table J to determine duplications. The essential binary input patterns, and resultant binary output patterns may then be selected by excluding all but one pair for each logic block. Such a technique may be performed by suitably programming the electronic data processing system to supply all permutations of binary input patterns and to develop the resultant binary output patterns by assuming all possible faults, one at a time.

While the invention has been particularly shown and described with reference embodiment thereof, it will be understood by those skilled in the art that the foregoing and other changes in form and details may be made therein without departing from the spirit and scope of the invention.

What is claimed is:

1. In a multiple-unit electronic data processing system constructed of a large number of separately replaceable circuits, a fault locating apparatus for identifying faulty circuits in a plurality of logic and control portions of a tested unit having normally accessible inputs and outputs so that they may be replaced, said fault locating apparatus including:

a source having a plurality of first lines, for sequentially generating on said first lines a plurality of input signal groups, selectively including and excluding a reset signal, each input signal group manifesting a binary input pattern;

connecting means having a plurality of second lines and a plurality of third lines, the second lines being connected to said first lines, for supplying via said third lines each input signal group from said source to the inputs of the logic and control portions of the tested unit and for connecting the reset signal, when present, to the control portions of the tested unit;

output means having a plurality of fourth lines and a plurality of fifth lines, the fourth lines being connected to the outputs of the tested unit, for detecting output signal groups, each output signal group manifesting as signals on said fifth lines a binary output pattern generated by the tested unit as a result of applying a corresponding one of the input signal groups to the inputs of the tested unit; and means having a plurality of sixth lines, connected to the fifth lines of said output means, operative to manifest as indicia the output signal groups as binary output patterns.

2. A fault locating apparatus for identifying faulty circuits in logic and control portions of a tested unit having normally accessible inputs and outputs, said fault locating apparatus including means for conducting a preliminary test of the control portions of the tested unit, comprising:

a source having a plurality of first lines, for sequentially generating on said first lines a plurality of input signal groups, at least one group including a reset signal, each input signal group manifesting a binary input pattern;

connecting means having a plurality of second lines and a plurality of third lines, the second lines being connected to said first lines, for supplying via said third lines each input signal group from said source to the inputs of the logic and control portions, and the reset signal to the control portions, of the tested unit;

output means having a plurality of fourth lines and a plurality of fifth lines, the fourth lines being connected to the outputs of the tested unit, for detecting ouput signal groups, each ouput signal group manifesting as signals on said fifth lines a binary output pattern generated by the tested unit as a result of applying a corresponding one of the input signal groups to the inputs of the tested unit;

accumulating means having a plurality of sixth lines and a plurality of seventh lines, the sixth lines being connected to the fifth lines of the output means, for combining a plurality of output signal groups; and recognition means, having a plurality of eighth lines connected to the seventh lines of the accumulating means, operative to indicate when the output signal groups combined in said accumulating means manifests a like-valued accumulated binary output pattern.

3. In a multiple-unit system wherein units may comprise large numbers of separately replaceable circuits, a fault locating apparatus for identifying faulty circuits in logic and control portions of a tested unit having available externally, inputs and outputs including means for conducting a test of the logic of a tested unit having correctly operating control portions comprising:

a source having first lines for sequentially generating a plurality of input signal groups on said first lines, each input signal group manifesting a binary input pattern;

connecting means having second lines and third lines, connected to the first lines of said source, for connecting each input signal group from said source to the inputs of the logic portions of the tested unit via said third lines;

output means having fourth and fifth lines, connected to said tested unit outputs via said fourth lines, for detecting output signal groups, each output signal group manifesting as signals on said fifth lines a binary output pattern generated by the tested unit as a result of applying a corresponding one of the input signal groups to the unit; and means having sixth lines, connected to said output means fifth lines via said sixth lines, operative to supply the output signal groups in human readable form.

4. A fault locating apparatus for conducting a preliminary test of the control portions and subsequent tests of the logic portions of a tested unit in an electronic data processing system, comprising in combination:

a source having outgoing lines for sequentially generating on its outgoing lines a set of input signal groups divided into a number of subsets, each input signal group manifesting a binary input pattern, at least one group in a first subset including a reset signal and groups in a second subset thereof selectively including and excluding a reset signal;

connecting means having incoming and outgoing lines, the incoming lines being connected to said source outgoing lines, for communicating on said connecting means outgoing lines the signal groups from said source to the logic and control portions of the tested unit and for connecting the reset signal, when present, to the control portions;

output means having incoming and outgoing lines, the incoming lines being connected to said tested unit, for detecting output signal groups from said tested unit, each output signal group manifesting at the output means output a binary output pattern generated by the tested unit as a result of applying a corresponding one of the input signal groups to the unit;

accumulating means having incoming and outgoing lines, the incoming lines being connected to the output means outgoing lines, for combining a plurality of output signal groups corresponding to the first subset of input signal groups and supplying a manifestation of said combination or indicia at said accumulating means outgoing lines;

recognition means having incoming lines and outputs, the incoming lines being connected to the accumulating means outgoing lines, operative to indicate at its outputs when aforesaid output signal groups combined in said accumulating means manifests a like-valued accumulated binary output patterns; and indicating means having incoming lines and outputs, the incoming lines being connected to said output means outgoing lines, operable subsequent to indication of like-valued binary output patterns by said recognition means output, to manifest at its outputs the binary output patterns corresponding to said second subset of input signal groups.

References Cited

UNITED STATES PATENTS

| | | | |
|---|---|---|---|
| 3,302,109 | 1/1967 | Jones | 340—149 X |
| 2,690,299 | 9/1954 | Kille. | |
| 2,945,915 | 7/1960 | Strip. | |
| 3,034,051 | 5/1962 | Higgins | 340—411 X |
| 3,155,939 | 7/1964 | Vadus | 340—146.1 |
| 3,246,240 | 5/1966 | Arnold et al. | |

MALCOLM A. MORRISON, Primary Examiner

R. STEPHEN DILDINE, JR., Assistant Examiner

U.S. Cl. X.R.

340—149